(No Model.)
I. FOX.
EYEGLASSES OR SPECTACLES.
No. 366,471. Patented July 12, 1887.
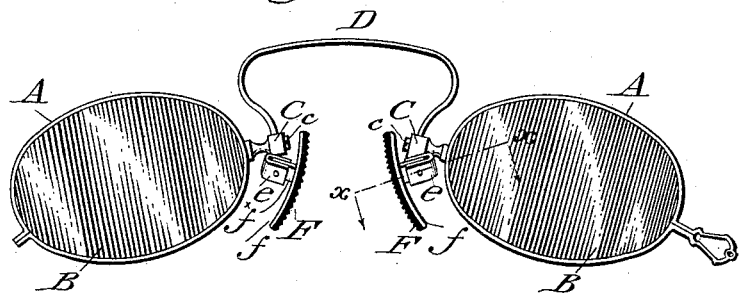
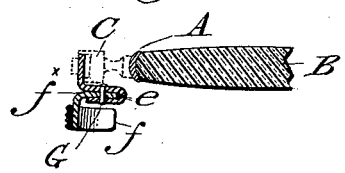
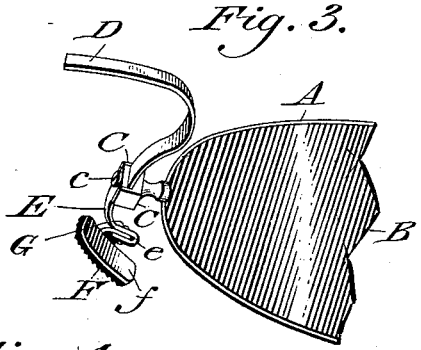
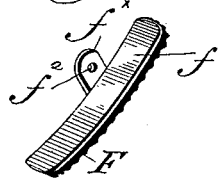
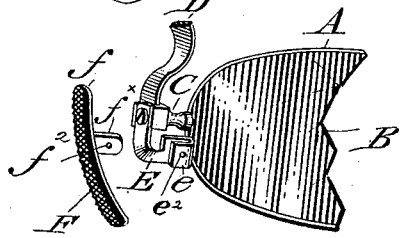
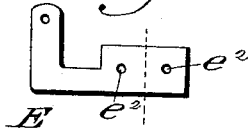
WITNESSES:
Ivan Fox
INVENTOR

UNITED STATES PATENT OFFICE.

IVAN FOX, OF PHILADELPHIA, PENNSYLVANIA.

EYEGLASSES OR SPECTACLES.

SPECIFICATION forming part of Letters Patent No. 366,471, dated July 12, 1887.

Application filed February 24, 1887. Serial No. 228,681. (No model.)

*To all whom it may concern:*

Be it known that I, IVAN FOX, a citizen of the United States residing in the City and County of Philadelphia, in the State of Pennsylvania, have invented certain improvements in Eye Glasses, of which the following is a specification.

My invention relates in general to eye glass and spectacle frames which are provided with nose pieces or pads, and especially to that class in which the nose pieces are pivotally attached to arms or prongs which carry them.

The object of my invention is a strong, mechanically simple, and cheap mode of pivotally attaching nose pieces, and to such end my invention comprehends the construction hereinafter described and claimed.

An eye-glass frame embodying my invention is represented in the accompanying drawing and described in this specification, the particular subject matter claimed as novel being hereinafter definitely specified.

In the drawings, Figure 1 is an elevational view of a pair of eye glasses embodying my improvements. Fig. 2 is a fragmentary sectional detail in the plane of the dotted line $x\,x$ of Fig. 1. Figs. 3, 4, and 5, are fragmentary perspective views illustrating my mode of application of the pivoted nose pieces. Fig. 6 is a diagram of a blank from which I form the arm for carrying the nose piece.

Similar letters of reference indicate corresponding parts.

In the drawings, A A are the rims, and B B the lenses of a pair of eye-glasses. The rims are provided with studs C of any preferred construction which carry the frame or are attached direct to the lenses, and to which the ends of the uniting bow-spring D are connected, conveniently by screws $c$ threading into said studs.

E are the arms for carrying the nose pieces or nose rests F. The nose rests are each composed of a pad of rubber, cork, or other usual material, designated in the drawings by the letter F, and the said pads are each mounted upon a pad plate or backing $f$ of pliable metal, stamped out or otherwise formed with a flange $f^x$ adapted to be bent up at an angle, being approximately a right angle to the plane of the back face of the plate as clearly shown in Fig. 5, so as to constitute a device for the attachment of the pad plate to its carrying arm.

$f^2$ is a hole through the flange.

The arms which are preferably formed of a malleable or readily bendible metal are secured to the studs by screws $c$, which, as stated, similarly secure the bow spring, and they are stamped or cut out of a blank essentially of the form represented in Fig. 6, each being in effect an angular prong, the short member of which depends direct from the stud while the prolonged lateral member is adapted at its outward extremity to be folded back upon itself as clearly represented in Figs. 2, 3 and 4, to form a fold $e$ adapted to embrace the flange $f^x$ of the pad plate. This fold is provided as to each of its sides with holes $e^2$ through which, as well as through the hole $f^2$ in the flange of the nose piece, a bolt, screw, rivet, or kindred fastening stud, G, passes, so as to effect the pivotal attachment of the nose piece to the arm, the flange of the plate of the pad proper being embraced by and free to move within the fold of said arm, so that the nose piece as an entirety is capable of a given movement for the adjustment of the glasses when in place upon the nose of the wearer.

I am aware that I am not the first to pivotally attach a nose piece to an eye glass frame, and to such an invention broadly I lay no claim, as the gist of this improvement resides in the special mode of attachment herein described and claimed.

Having thus described my invention, I claim:—

1. In combination with an eye glass or spectacle frame,—arms connected with the frame and each as to its terminal extremity bent back upon itself to form a fold,—nose pieces having each a flange adapted to be entered within the fold of an arm,—and a pivot pin or equivalent contrivance passing through both members of the fold of each arm and through the flange of the nose piece entered within said fold, substantially as and for the purposes set forth.

2. In an eye-glass or spectacle, the following elements in combination: two studs for supporting the lenses; a bow spring uniting said studs; two arms, connected each at one extremity with a given stud and at the other extremity formed into or provided with a folded portion; nose pieces provided with flanges respectively entered within the respective folds of the arms; and pivot pins respectively passing through the folds and their contained flanges, substantially as and for the purposes set forth.

3. The combination to form an adjustable nose rest for application to eye glasses or spectacles, of an arm of metal adapted at one extremity to be connected with the lens frame and at the other extremity bent upon itself to form a fold, and a nose piece having a rearwardly projecting flange adapted to be entered within said fold of the arm and secured therein by a pivot pin passing through it and both members of the fold, substantially as and for the purposes set forth.

In testimony whereof I have hereunto signed my name this 14th day of February, A. D. 1887.

IVAN FOX.

In the presence of—
J. BONSALL TAYLOR,
WM. C. STRAWBRIDGE.